Jan. 30, 1968  H. O. JENSEN  3,365,795
METHOD OF MANUFACTURING HYSTERESIS MOTORS
Original Filed Aug. 25, 1961  2 Sheets-Sheet 1

United States Patent Office 3,365,795
Patented Jan. 30, 1968

3,365,795
METHOD OF MANUFACTURING HYSTERESIS MOTORS
Helmar O. Jensen, Wantagh, N.Y., assignor to Hysteresis Motor Research, Inc., a corporation of New York
Original application Aug. 25, 1961, Ser. No. 134,036, now Patent No. 3,206,629, dated Sept. 14, 1965. Divided and this application Feb. 19, 1965, Ser. No. 434,004
6 Claims. (Cl. 29—596)

ABSTRACT OF THE DISCLOSURE

In the manufacture of a stator structure for an outside-rotor hysteresis motor, a series of spider laminations are punched from magnetic material heat-treated for substantially maximum tensile strength, each of such laminations having a series of radially extending winding slots, an integral central yoke ring portion, and an integral outer magnetic bridge ring portion. The outer bridge ring portion is severed by punching, leaving a central spider. The spider laminations are then annealed to increase their permeability, assembled into a stack, and the bridge-ring laminations unannealed are assembled on the stack. The stator is then completed by disposing a winding in the slots and the elements are cemented together to form a unitary stator structure.

---

Figure 1A:
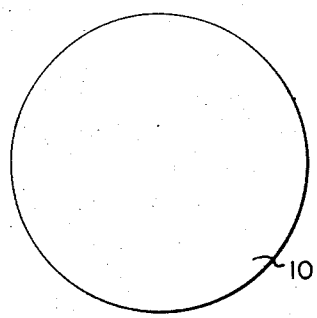

This application is a division of application Ser. No. 134,036, filed Aug. 25, 1961, now Patent No. 3,206,629 of Helmar O. Jensen, and entitled, "Stator for Hysteresis Motors and Method of Manufacturing the Same."

This invention relates to the method of manufacturing stators for hysteresis motors and particularly to closed-slot stators for use in motors of the outside-rotor type.

As described in Roters Patent 2,547,599, the optimum design of hysteresis synchronous motors requires that the ends of the winding slots facing the rotor be closed by magnetic bridges. These magnetic bridges may be either in the form of individual slot wedges or, preferably, in the form of a bridge ring integral with the stator laminations, as described in aforesaid Roters Patent.

In the fabrication of a stator for an outside hysteresis rotor, the type of construction described becomes difficult or costly to fabricate. This difficulty arises from the fact that the bridge ring is of such a small radial thickness that if the inner ends of the winding slots are left open for winding, the lamination becomes quite fragile and difficult to handle and maintain in correct shape. Moreover, such a construction would involve winding the stator from the central bore, which is more costly and time-consuming than winding it through openings in the outer ends of the winding slots, particularly in the case of miniature precision motors to which this type of motor design is particularly suitable.

Consequently, it has become standard practice in the fabrication of stators of the type under consideration, to punch the stator laminations with the outer ends of the winding slots open and, thereafter, to insert magnetic wedges in these slots and then grind the entire assembly to a finished outer diameter. This is not only a painstaking and costly procedure but it has been found, in practice, that the wedges occasionally are loosened during the grinding process in finishing the stator surface. Moreover, it is difficult to get a precisely uniform magnetic circuit throughout the periphery of the stator.

It is an object of the invention, therefore, to provide a new and improved method of manufacture of stator structures for hysteresis motors of the type described.

In accordance with the invention, the method of manufacturing a stator structure of a hysteresis synchronous motor of the outside-rotor type comprises punching a series of spider laminations of magnetic material each having a series of radially outwardly extending open winding slots and an integral central yoke ring portion, punching a series of bridge-ring laminations of magnetic material heat-treated for substantially maximum tensile strength and dimensioned closely to fit over the spider laminations, annealing the spider laminations to increase their permeability, assembling the annealed laminations in a stack, disposing a winding in the winding slots, assembling the bridge rings unannealed on the stack of spider laminations, and at one or more predetermined points in the preceding sequence of operations adhering the spider laminations and the bridge-ring laminations to each other and together to form a unitary structure.

Further in accordance with the invention, the method of manufacturing a stator structure for a hysteresis synchronous motor of the outside-rotor type comprises punching a series of annular core laminations of magnetic material, heat-treated for substantially maximum tensile strength, each of such laminations having a series of radially extending winding slots, an integral central yoke ring portion, and an integral outer magnetic bridge ring portion, severing the outer bridge ring portion from each of the core laminations, leaving a central spider, annealing the spider laminations to increase their permeability, assembling the spider laminations in a stack, disposing a winding in the winding slots, assembling the bridge-ring laminations unannealed on the stack of spider laminations, and at one or more predetermined points in the preceding sequence of operations adhering the spider laminations and the bridge-ring laminations to each other and together to form a unitary structure.

For a better understanding of the present invention, together with other and further objects thereof, reference is had to the following description, taken in connection with the accompanying drawings, while its scope will be pointed out in the appended claims.

Figure 1B:
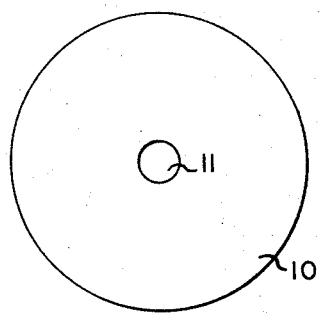
Figure 1C:
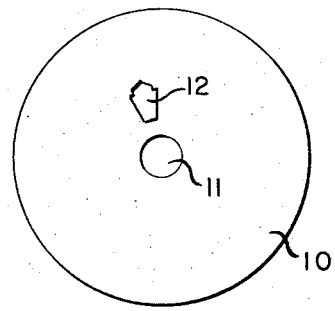
Figure 1D:
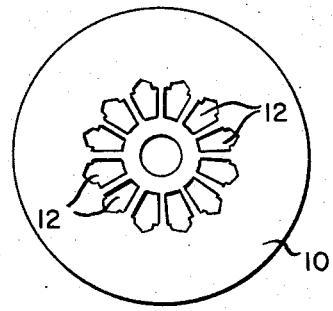
Figure 1E:
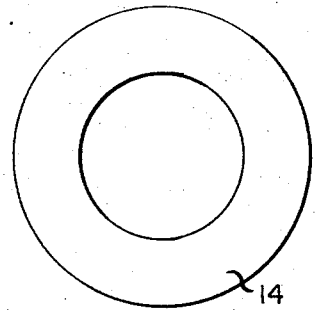
Figure 1F:
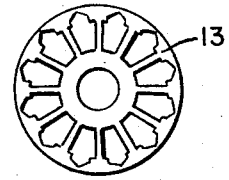
Figure 1G:
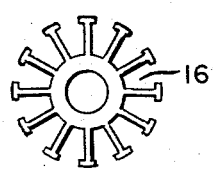
Figure 1H:
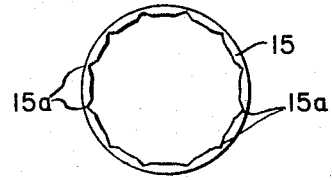
Figure 2:
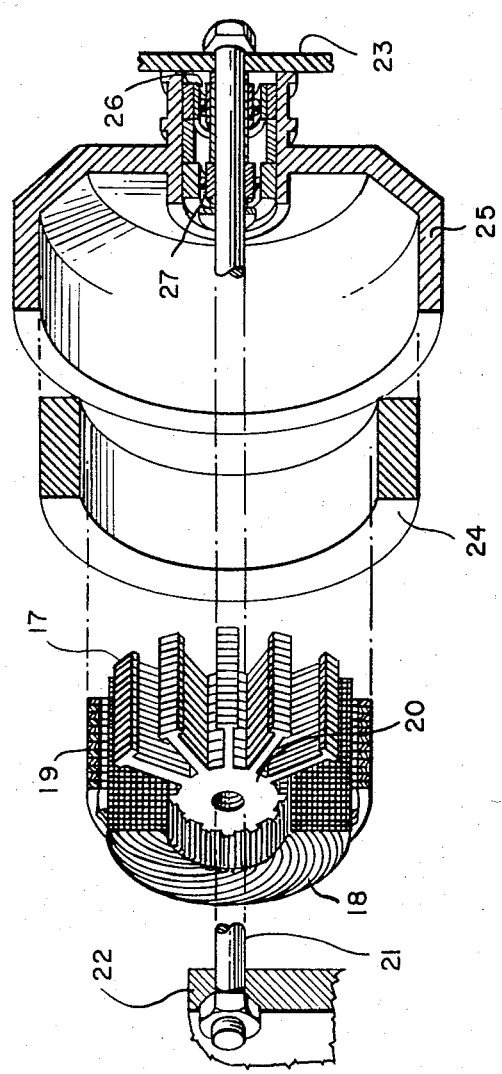

Referring now to the drawings:

FIGS. 1a–1h, inclusive, represent the successive steps in the method of manufacturing a stator structure embodying the invention, while FIG. 2 is an exploded perspective view of an outside-rotor hysteresis motor including a stator structure manufactured in accordance with the present invention.

In general, the method of manufacturing a stator structure for a hysteresis synchronous motor of the outside-rotor type comprises the punching of a series of spider laminations of magnetic material, each having a series of radially outwardly extending open winding slots and an integral central yoke ring portion and, in addition, punching a series of bridge-ring laminations of magnetic material of high tensile strength, that is, not heat-treated for optimum magnetic properties, and dimensioned to fit closely over the spider laminations. While the spider laminations and the bridge-ring laminations may be fabricated independently, preferably they are fabricated from a single lamination blank, as represented in FIGS. 1a–1h, inclusive. In this method of fabrication, there are first punched a series of annular core laminations of magnetic material each having a series of radially extending winding slots, an integral central yoke ring portion, and an integral outer magnetic bridge ring portion of outer radius exceeding the finished radius of the stator.

For example, starting with the lamination blank 10 of FIG. 1a, there is first punched a pilot hole 11, FIG. 1b, and then one winding slot 12 is punched in a random position, as shown in FIG. 1c. The remaining winding slots 12, FIG. 1d, are then punched, their positions being located by indexing from the initial slot 12 of FIG. 1c. This is known as progressive die punching and is employed principally for small quantity production; for larger production, a compound die is preferably employed to form the punched lamination of FIG. 1d from that of FIG. 1b in a single operation.

As shown in FIGS. 1e and 1f, the lamination 10 is punched or separated into a useful lamination 13 and an annulus 14 of excess metal, which is initially required in order to maintain the rigidity and shape of the blank during the punching operations of FIGS. 1b, 1c, and 1d. This excess metal annulus 14 is, of course, then discarded. As shown in FIGS. 1g and 1h, an outer bridge ring 15 is severed by punching from the lamination 13 of FIG. 1f, leaving a central spider 16. The outer bridge ring 15, it will be noted, has indentations 15a which register with the centers of the winding slots of the spider 16 and reduce the radial dimensions of the bridge rings at these points for a purpose described hereinafter.

The lamination blank 10, from which the spider laminations and bridge-ring laminations are punched as described, may be of the usual transformer lamination stock commercially available, usually a silicon steel. Such a stock, as received, is usually heat-treated so that it develops substantially its best punching properties. Generally, in this state, the tensile strength is considerably higher than when fully annealed to develop the best magnetic properties. When starting with a blank of this character, the spider laminations 16 are then preferably annealed or otherwise heat-treated to increase their magnetic permeability. These laminations are then assembled in a stack in a conventional manner and a stator winding disposed in the slots, also in a conventional manner. The outer surface of the assembled stack of spider laminations is then preferably given a light finishing grind to bring the stator stack to a predetermined outer diameter and reduce any surface irregularities arising from the inevitable tolerances in the punching operation.

After the stack of spider laminations is assembled, finished, and wound as described, the bridge-ring laminations 15a are assembled thereon, also in a conventional manner. In the specific embodiment described, the bridge rings 15 are punched or severed from the unannealed blank 10 which, as stated above, has been previously heat-treated for substantially best punching properties having high tensile strength. On the other hand, if the bridge rings 15 are punched from separate lamination stock initially, which has not previously been heat-treated for best punching properties, these rings should be so treated.

It will be understood that at one or more points in the preceding sequence of assembly operations, the spider laminations will be adhered by conventional thermosetting cement or equivalent and the bridge rings 15 will similarly be adhered to each other and to the stack of spider laminations 16 with the winding disposed thereon so that, upon thermosetting, there is developed a unitary stator structure. This process of adhering the various laminations together may follow the method described in Roters Patent No. 2,423,345. After assembly as described, the unitary stator structure may be encapsulated in a thermosetting resin in a conventional manner, if desired. Whether or not so encapsulated, the outer periphery of the stator structure is then ground or otherwise finished to remove any excess radial dimension of the bridge rings 15, which are usually punched slightly oversize for the sake of rigidity during the assembly operation.

An exploded perspective fragmentary view of a hysteresis motor embodying the stator structure fabricated by the method described is shown in FIG. 2. As shown in FIG. 2, the stator structure comprises an annealed laminated magnetic core structure comprising the spider stack 17 having a series of radially outwardly extending, angularly spaced winding slots open at their outer ends and separated by a series of radially extending teeth having a central integral yoke ring portion 20. A distributed winding 18 of conventional configuration is disposed in the slots of the stack 17. The stator structure further comprises a bridge ring consisting of the stack of bridge-ring laminations 19 surrounding and closely fitting the teeth of the core structure. The bridge ring comprising the stack 19 has reduced radial dimensions intermediate the teeth of the stack 17 for determining the reluctances of the magnetic paths shunting the rotor. The central pilot holes 11 of the laminations (FIGS. 1b, 1c) are bored to receive a mounting shaft 21 disposed in supports 22, 23.

The rotor of the motor of FIG. 2 comprises a ring or annulus 24 of material having high coercivity, this ring being mounted in a supporting shell 25 supported by and rotatable on the shaft 21 through anti-friction bearings 26 and 27.

In the design of a stator structure for hysteresis motors it is, of course, desirable that all of the magnetic core be of high permeability material in order to reduce stator iron losses. However, in the ordinary grades of silicon steel laminations, the permeability is generally inversely related to the tensile strength. It is believed that this arises from the fact that laminations annealed to develop high magnetic permeability develop a relatively large crystal structure having a relatively low tensile strength. On the other hand, such laminations, heat-treated for best punching properties, have a considerably higher tensile strength and a finer grain crystalline structure which is of relatively low permeability. Therefore, fabrication of the stator structure by the method described permits the core structure to be of annealed stock having a relatively high permeability. This is important since the greater portion of the volume of the iron in the stator is in this core structure. Alternatively, the core laminations may be constructed of a ferro-cobalt alloy of high cobalt content, for example 50%, which has a very high saturation density and a reasonably high permeability.

On the other hand, the bridge-ring laminations 15, if punched from the same unannealed stock, can be assembled without annealing or, if independently punched from separate laminations, can be independently heat-treated to provide maximum tensile strength. The fact that the permeability of the bridge rings is reduced is relatively of less importance since the radial flux density through the bridge rings at the fundamental frequency is very low so that the iron losses become inconsequential. Moreover, because of the higher reluctance of the bridge ring material, less of the fundamental frequency flux is shunted from the rotor for any given radial thickness of bridge ring or, conversely, for any given flux-shunting effect, the radial thickness of the bridge ring may be substantially increased, thereby decreasing its structural fragility. Because of the relatively low permeability of such a bridge ring, it may be desirable slightly to increase its minimum thickness, that is, the thickness at the indentations 15a (FIG. 1h), in order to ensure adequate shunting of the harmonic components of flux, which develop spurious hysteresis losses, from the rotor. As an alternative to the use of a relatively high-tensile-strength unannealed silicon steel sheet for the bridge rings 19, they may be constructed of a 50% nickel-iron alloy, commercially available from Allegheny Ludlum Steel Corporation as No. 4750 metal. This metal, unannealed, has a very high tensile strength but also a relatively low permeability. At the same time, it has a lower saturation density than conventional silicon steel and hence its use in the bridge rings accentuates the desirable effect of the low-permeability silicon-steel bridge rings discussed above. Moreover, the use of such a nickel-iron alloy for the bridge rings, which form the exposed periphery of the stator structure, materially reduces corrosion of this surface, due to the corrosion resistance of the material.

While it will be apparent that a motor manufactured in accordance with the present invention may have a wide range of design parameters in accordance with the particular application requirements, there follow the specifications of one motor embodying the invention yielding satisfactory operating performance.

Stator structure (finished dimensions):

| | |
|---|---|
| Central core | 0.007 inch high-silicon steel commercially available from Armco Steel Corporation as Trancor T. |
| Outer diameter | 0.558 inch. |
| Twelve teeth | 0.025 inch wide. |
| Yoke ring 20: | |
|    Minimum radial thickness | 0.054 inch. |
|    Center hole | 0.171 inch diameter. |
| Bridge ring 19: | |
|    Unannealed silicon steel stock | Same as central core. |
|    Maximum radial thickness | 0.027 inch. |
|    Minimum bridge thickness | 0.007 inch. |
|    Outer diameter | 0.612 inch. |
|    Stack length | 0.226 inch. |

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. The method of manufacturing a stator structure of a hysteresis synchronous motor of the outside-rotor type comprising: punching a series of spider laminations of magnetic material each having a series of radially outwardly extending open winding slots and an integral central yoke ring portion; punching a series of bridge-ring laminations of magnetic material heat-treated for substantially maximum tensile strength and dimensioned closely to fit over said spider laminations; annealing said spider laminations to increase their permeability; assembling said annealed laminations in a stack; disposing a winding in said slots; assembling said bridge rings unannealed on said stack; and at one or more predetermined points in the preceding sequence of operations adhering said spider laminations and said bridge-ring laminations to each other and together to form a unitary structure.

2. The method of manufacturing a stator structure of a hysteresis synchronous motor of the outside-rotor type comprising: punching a series of spider laminations of magnetic material each having a series of radially outwardly extending open winding slots and an integral central yoke ring portion; punching a series of bridge-ring laminations of magnetic material heat-treated for substantially maximum tensile strength and dimensioned closely to fit over said spider laminations and having an outer radius exceeding the finished dimension of the stator; annealing said spider laminations to increase their permeability; assembling said annealed laminations in a stack; disposing a winding in said slots; assembling said bridge rings unannealed on said stack; at one or more predetermined points in the preceding sequence of operations adhering said spider laminations and said bridge-ring laminations to each other and together to form a unitary structure; and finishing the outer periphery of said structure to remove the excess radial dimension of said bridge rings.

3. The method of manufacturing a stator structure for a hysteresis synchronous motor of the outside-rotor type comprising: punching a series of spider laminations of magnetic material each having a series of radially outwardly extending open winding slots and an integral central yoke ring portion; punching a series of bridge-ring laminations of magnetic material heat-treated for substantially maximum tensile strength and dimensioned closely to fit over said spider laminations; annealing said spider laminations to increase their permeability; assembling said annealed laminations in a stack; disposing a winding in said slots; finishing the outer surface of said assembled stack to a predetermined outer diameter; assembling said bridge rings unannealed on said stack; and at one or more predetermined points in the preceding sequence of operations adhering said spider laminations and said bridge-ring laminations to each other and together to form a unitary structure.

4. The method of manufacturing a stator structure for a hysteresis synchronous motor of the outside-rotor type comprising: punching a series of annular core laminations of magnetic material, heat-treated for substantially maximum tensile strength, each of said laminations having a series of radially extending winding slots, an integral central yoke ring portion, and an integral outer magnetic bridge ring portion; severing said outer bridge ring from each of said laminations, leaving a central spider; annealing said spider laminations to increase their permeability; assembling said spider laminations in a stack; disposing a winding in said winding slots; assembling said bridge-ring laminations unannealed on said stack; and at one or more predetermined points in the preceding sequence of operations adhering said spider laminations and said bridge-ring laminations to each other and together to form a unitary structure.

5. The method of manufacturing a stator structure for a hysteresis synchronous motor of the outside-rotor type comprising: punching a series of annular core laminations of magnetic material, heat-treated for substantially maximum tensile strength, each of said laminations having a series of radially extending winding slots, an integral central yoke ring portion, and an integral outer magnetic bridge ring portion of outer radius exceeding the finished radius of the stator; severing said outer bridge ring from each of said laminations, leaving a central spider; assembling said spider laminations in a stack; disposing a winding in said winding slots; assembling said bridge-ring laminations unannealed on said stack; at one or more predetermined points in the preceding sequence of operations adhering said spider laminations and said bridge-ring laminations to each other and together to form a unitary structure; and finishing the outer periphery of said structure to remove the excess radial dimension of said bridge rings.

6. The method of manufacturing a stator structure for a hysteresis synchronous motor of the outside-rotor type comprising: punching a series of annular core laminations of magnetic material, heat-treated for substantially maximum tensile strength, each of said laminations having a series of radially extending winding slots, an integral central yoke ring portion, and an integral outer magnetic bridge ring portion; severing said outer bridge ring from each of said laminations, leaving a central spider; assembling said spider laminations in a stack; disposing a winding in said winding slots; finishing the outer surface of said assembled stack to a predetermined outer diameter; assembling said bridge-ring laminations unannealed on said stack; and at one or more predetermined points in the preceding sequence of operations adhering said spider laminations and said bridge-ring laminations to each other and together to form a unitary structure.

References Cited

UNITED STATES PATENTS

| | | | |
|---|---|---|---|
| 2,018,405 | 10/1935 | Langworthy | 29—155.61 |
| 2,423,345 | 7/1947 | Rotors | 29—155.5 |
| 2,919,357 | 12/1951 | Lung | 29—155.5 |

JOHN F. CAMPBELL, *Primary Examiner.*

C. E. HALL, *Assistant Examiner.*